United States Patent
Logan et al.

(10) Patent No.: US 9,994,403 B2
(45) Date of Patent: Jun. 12, 2018

(54) HOSE FOR BULK TRANSFER OPERATIONS

(71) Applicants: M-I L.L.C., Houston, TX (US); M-I DRILLING FLUIDS UK LTD., Scotland (GB); SCHLUMBERGER NORGE AS, Stavanger (NO)

(72) Inventors: Gordon M. Logan, Aberdeen (GB); Colin Lauder, Richmond, TX (US); Frode Rasmussen, Tjelta (NO)

(73) Assignees: M-I L.L.C., Houston, TX (US); M-I Drilling Fluids UK Ltd., Aberdeen (GB); Schlumberger Norge AS, Stavanger (NO)

( * ) Notice: Subject to any disclaimer, the term of this patent is extended or adjusted under 35 U.S.C. 154(b) by 65 days.

(21) Appl. No.: 15/027,191

(22) PCT Filed: Oct. 2, 2014

(86) PCT No.: PCT/US2014/058734
§ 371 (c)(1),
(2) Date: Apr. 4, 2016

(87) PCT Pub. No.: WO2015/051063
PCT Pub. Date: Apr. 9, 2015

(65) Prior Publication Data
US 2016/0236877 A1    Aug. 18, 2016

Related U.S. Application Data

(60) Provisional application No. 61/886,345, filed on Oct. 3, 2013.

(51) Int. Cl.
*B65G 53/50* (2006.01)
*B65G 53/52* (2006.01)
(Continued)

(52) U.S. Cl.
CPC ............ *B65G 53/521* (2013.01); *B65G 53/00* (2013.01); *B65G 53/52* (2013.01); *F16L 11/12* (2013.01);
(Continued)

(58) Field of Classification Search
CPC ................................ B65G 53/50; F16L 11/22
(Continued)

(56) References Cited

U.S. PATENT DOCUMENTS

| 390,929 A | 10/1888 | Wells |
| 1,129,902 A * | 3/1915 | Reardon ................... B07B 7/08 |
| | | 209/133 |

(Continued)

FOREIGN PATENT DOCUMENTS

| CN | 202327403 U | 7/2012 |
| DE | 1055964 B | 4/1959 |

(Continued)

OTHER PUBLICATIONS

Office action for the equivalent Japanese patent application 2016-546876 dated Feb. 20, 2017.
(Continued)

*Primary Examiner* — Joseph Dillon, Jr.
(74) *Attorney, Agent, or Firm* — David J. Smith

(57) ABSTRACT

An elongate apparatus is disclosed and comprises a material passage and one or more fluid passages. The material passage receives material therethrough. The one or more fluid passages are in fluid communication with the material passage. The material passage and the one or more fluid passages extend substantially parallel throughout the apparatus. A method comprises transferring material in a material passage and further comprises injecting a fluid into the material passage via one or more injection points located along a length of the material passage.

8 Claims, 3 Drawing Sheets

(51) Int. Cl.
*F16L 11/22* (2006.01)
*F16L 11/12* (2006.01)
*F16L 55/24* (2006.01)
*B65G 53/00* (2006.01)
*B65G 53/18* (2006.01)
*B65G 53/30* (2006.01)

(52) U.S. Cl.
CPC .............. *F16L 11/22* (2013.01); *F16L 55/24* (2013.01); *B65G 53/18* (2013.01); *B65G 53/30* (2013.01)

(58) Field of Classification Search
USPC .................. 406/94, 95; 138/115, 116, 117
See application file for complete search history.

(56) References Cited

U.S. PATENT DOCUMENTS

| | | | | |
|---|---|---|---|---|
| 1,465,269 | A * | 8/1923 | Horn | F23K 3/00 406/85 |
| 1,958,561 | A * | 5/1934 | Bennett | F23J 1/00 110/171 |
| 2,219,011 | A * | 10/1940 | Kidwell | B02C 19/063 241/39 |
| 2,739,845 | A * | 3/1956 | Berg | B01J 8/0025 406/95 |
| 2,852,313 | A * | 9/1958 | Mickel | B65G 53/30 406/136 |
| 2,874,999 | A * | 2/1959 | Lofgren | B65G 53/20 406/120 |
| 3,070,403 | A * | 12/1962 | Shelton-V | B65G 53/58 406/120 |
| 3,524,478 | A * | 8/1970 | Allenspach | B65G 53/525 138/111 |
| 3,537,755 | A * | 11/1970 | Schmidt | C10B 31/00 406/109 |
| 3,626,985 | A * | 12/1971 | Erickson | F16L 9/18 138/115 |
| 3,903,929 | A | 9/1975 | Mock | |
| 3,991,822 | A * | 11/1976 | Morris | B21C 37/14 138/115 |
| 4,025,121 | A * | 5/1977 | Kleysteuber | B65G 35/005 406/137 |
| 4,281,946 | A * | 8/1981 | Kanics | B65G 53/06 406/95 |
| 4,515,503 | A * | 5/1985 | Snowdon | B65G 53/525 406/11 |
| 4,595,317 | A * | 6/1986 | Moller | B65G 53/521 138/111 |
| 4,615,648 | A * | 10/1986 | Merz | B65G 53/521 406/95 |
| 4,824,288 | A * | 4/1989 | Naito | E02B 11/00 138/105 |
| 4,975,055 | A * | 12/1990 | LaPlante | F16L 9/19 138/111 |
| 5,190,415 | A * | 3/1993 | Allerton | B65G 53/521 406/118 |
| 5,195,852 | A * | 3/1993 | Malugani | B65G 53/42 406/151 |
| 5,224,802 | A * | 7/1993 | Federhen | B65G 53/525 406/11 |
| 5,236,016 | A * | 8/1993 | Vogelsang | H02G 3/0487 138/111 |
| 5,240,355 | A * | 8/1993 | Hudalla | B65G 53/525 406/192 |
| 5,252,007 | A * | 10/1993 | Klinzing | B65G 53/66 406/14 |
| 5,664,607 | A * | 9/1997 | van Wassenhove | B60R 16/0215 138/107 |
| 5,775,851 | A * | 7/1998 | Waeschle | B65G 53/521 406/14 |
| 5,878,785 | A * | 3/1999 | Beijaard | A22B 7/004 138/111 |
| 6,044,869 | A | 4/2000 | Koob | |
| 6,764,253 | B1 * | 7/2004 | Pfeiffer | B65G 53/521 406/11 |
| 6,786,681 | B2 * | 9/2004 | Grasshoff | B65G 53/28 406/11 |
| 6,929,035 | B2 * | 8/2005 | Debaisieux | B21C 37/14 138/115 |
| 6,935,813 | B2 * | 8/2005 | Van Dorst | B65G 53/66 137/114 |
| 7,192,222 | B2 * | 3/2007 | Van Mullekom | B65G 53/28 406/151 |
| 7,967,032 | B2 * | 6/2011 | Harada | F02B 29/0456 138/116 |
| 8,529,161 | B2 * | 9/2013 | Gilbert | B01L 3/502776 356/246 |
| 8,801,339 | B2 * | 8/2014 | Durr | B65G 53/525 138/116 |
| 2001/0017163 | A1 * | 8/2001 | Penza | F16L 11/20 138/98 |
| 2002/0187012 | A1 * | 12/2002 | Grasshoff | B65G 53/28 406/95 |
| 2004/0033035 | A1 * | 2/2004 | Morris | F16L 9/19 385/100 |
| 2005/0011570 | A1 * | 1/2005 | Hayton | F16L 3/23 138/110 |
| 2007/0137717 | A1 * | 6/2007 | Vakili | F15D 1/02 138/39 |
| 2008/0264508 | A1 | 10/2008 | Adamson et al. | |
| 2013/0219647 | A1 * | 8/2013 | Calluiere | B60S 1/3805 15/250.01 |
| 2015/0061281 | A1 * | 3/2015 | Huang | F16L 39/005 285/123.1 |

FOREIGN PATENT DOCUMENTS

| | | |
|---|---|---|
| DE | 2209674 A1 | 9/1973 |
| DE | 7834365 U1 | 3/1979 |
| DE | 3535093 A1 | 4/1987 |
| EP | 1623941 A1 | 2/2006 |
| EP | 1911702 A1 | 4/2008 |
| FR | 1431644 A | 3/1966 |
| JP | S42-006787 | 3/1967 |
| JP | UM S47-026887 | 11/1972 |
| JP | UM S61-175682 | 11/1986 |
| JP | H7-027260 A | 1/1995 |
| JP | 2002-089757 A | 3/2002 |
| JP | 2004-300940 A | 10/2004 |
| JP | 2005-163479 A | 6/2005 |

OTHER PUBLICATIONS

Extended search report for the equivalent European patent application 14850440.0 dated Apr. 18, 2017.
Office action for the equivalent Canadian patent application 2926196 dated May 1, 2017.
Office action for the equivalent Eurasian patent application 201690705 dated Jul. 26, 2017.
International Search Report and Written Opinion dated Jan. 12, 2015, issued by the Patent Cooperationi Treaty (PCT) in related International Application No. PCT/US2014/058734 (14 pages).

* cited by examiner

US 9,994,403 B2

HOSE FOR BULK TRANSFER OPERATIONS

CROSS REFERENCE TO RELATED APPLICATIONS

This application claims benefit under 35 U.S.C. § 119(e) of U.S. Provisional Patent Application No. 61/886,345, filed on Oct. 3, 2013, entitled "Hose For Bulk Transfer Operations," which is incorporated by reference in its entirety.

BACKGROUND

The present disclosure contemplates that many applications involve transferring materials such as fluids and/or solids from one location to another location. Some examples of this include water treatment applications, hazardous material handling applications, and drilling applications, among others.

In oil drilling environments, for example, materials include fluid and cuttings from drilling activities. These materials are transferred from a drilling location (e.g., an offshore oil rig) to a transportation vehicle (e.g., supply vessel). Similarly, a transportation vehicle also transfers materials from the transportation vehicle to an onshore facility. Failure to maintain a steady and fast flow of materials could mean increased non-productive time, equipment damage, and higher costs.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

In the drawings.

DETAILED DESCRIPTION

Figure 1:
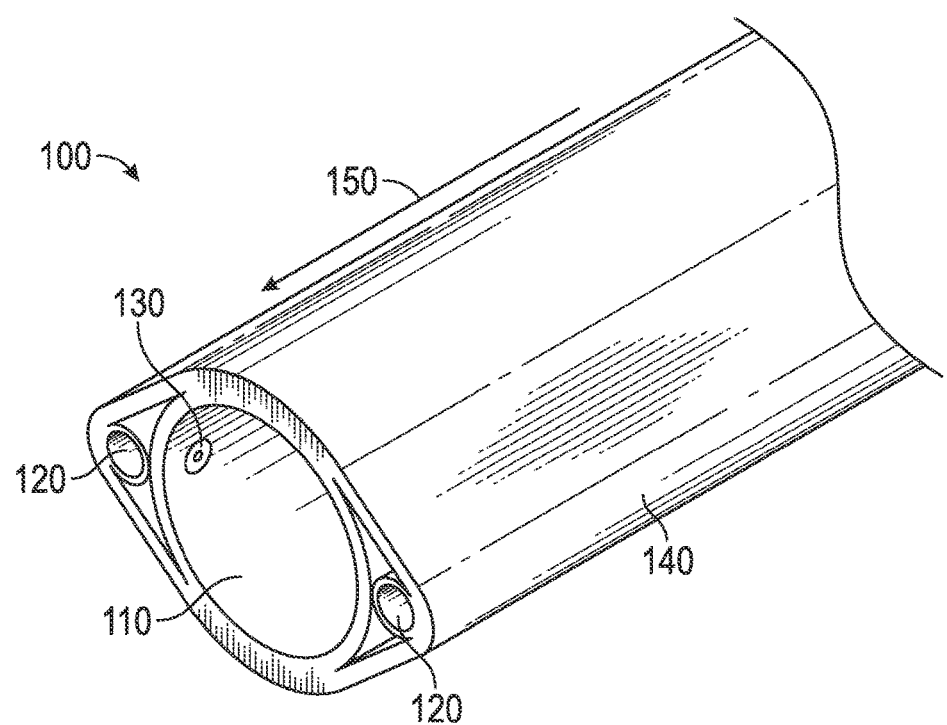
FIG. 1 depicts a perspective view of an example elongate apparatus.

In the following detailed description, reference is made to the accompanying drawings, which form a part hereof. In the drawings, similar symbols typically identify similar components, unless context dictates otherwise. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is generally drawn to systems, devices, apparatus, and/or methods related to bulk transfer of materials. Specifically, the disclosed systems, devices, apparatus, and/or methods relate to transfer of oilfield materials from one location to another location using an elongate apparatus.

The present disclosure contemplates that some conventional bulk transfer mechanisms utilize air injection lines to push and/or urge materials through a plurality of hoses between a source (e.g., shaker(s) on an offshore oil rig) and a destination (e.g., supply vessel). In this manner, air may be injected through the hoses to break up any potential blockages and to maintain a steady material flow. External fittings are used to combine multiple hoses and also as means to introduce the air injection into the hoses. These external fittings make the conventional bulk transfer mechanisms bulky, heavy, and difficult to handle.

FIG. 1 depicts an example elongate apparatus 100, in accordance with at least one embodiment of the present disclosure. Some example elongate apparatuses may have a length (e.g., from one end to another end) that is substantially longer than its width. For example, the elongate apparatus 100 may be a hose such as a transfer hose. Elongate apparatus 100 may include a material passage 110, and fluid passage(s) 120. The elongate apparatus 100 may include an exterior covering 140 encompassing, surrounding, and/or covering the material passage 110 and fluid passage(s) 120. A fluid, such as a gas (e.g., air) and/or a liquid (e.g., oils, chemicals), may be injected or otherwise provided into material passage 110 via injection point(s) 130. The material passage 110 may be substantially larger than the fluid passage(s) 120.

In some examples, the material passage 110 may be defined or formed with a hollow tube, pipe, or other conduit in which material may pass through. The material passage 110 may have a length defined between two ends, an inlet end and an outlet end. Material may pass through the material passage 110 from the inlet end to the outlet end. In some examples, the material passage 110 may be formed with a hose such as a material hose.

The material hose forming the material passage 110 may be flexible, semiflexible, and/or rigid. In some examples, the material hose may be made of plastic, rubber, composites, polymers, and/or metals. For example, the material hose may be made of synthetic rubber, natural rubber, nylon, polyurethane, polyethylene, poly(vinyl chloride), polytetrafluoroethylene, stainless steel, and/or other known substances.

In some examples, the material passage 110 may have a diameter of approximately 5 inches. In some examples, the material passage 110 may have a diameter in a range of 2 inches to 8 inches. In some examples, the material passage 110 may have a diameter in a range of 4 inches to 6 inches. A person of ordinary skill in the art will appreciate that different dimensions of the material passage 110 may be used depending upon the material to be moved from the inlet end to the outlet end of the material passage 110 as well as the application of use.

The fluid passage(s) 120 may be adjacent to the material passage 110. In this manner, two fluid passages 120 may each be substantially parallel with material passage 110 along the entire length of the elongate apparatus 100. In some examples, the length of the fluid passage(s) 120 may be less than the length of the elongate apparatus 100. In some examples, the fluid passage(s) 120 may be formed with hoses such as fluid hoses.

In some examples, the fluid passage(s) 120 may be relatively smaller in diameter than material passage 110. FIG. 1, for example, depicts an example elongate apparatus 100 having a material passage 110 and two fluid passages 120, where the two fluid passages 120 each have a relatively smaller diameter than the material passage 110.

In some examples, the fluid passage(s) 120 may receive fluid from a fluid source. If the fluid is air, the fluid source may be an air pump, air blower, or other air supply device known in the art. Other fluid sources may introduce oil, drilling fluids, and/or chemicals for lubrication, among other fluids, into the fluid passage(s) 120. Fluid introduced into the fluid passage(s) 120 may be compressed or non-compressed. For example, air may be introduced into the fluid passage(s) 120 at one or more locations of the elongate apparatus 100, including at an inlet, outlet, and/or intermediate location(s) along the length of the elongate apparatus 100.

The fluid hoses forming the fluid passage(s) 120 may be flexible, semi-flexible, and/or rigid. In some examples, the fluid hoses may be made of plastic, rubber, composites, polymers, and/or metals. For example, the fluid hoses may be made of synthetic rubber, natural rubber, nylon, polyurethane, polyethylene, poly(vinyl chloride), polytetrafluoroethylene, stainless steel, and/or other known substances. In some examples, the fluid hoses may be constructed of the same substance as the material hose, while in some examples the fluid hoses and the material hose may be constructed of a different substance.

In some examples, the fluid passage(s) 120 may have a diameter of approximately 2 inches. In some examples, the fluid passage(s) 120 may have a diameter in a range of 0.5 inches to 5 inches.

The fluid passage(s) 120 may provide fluid into material passage 110 at the injection point(s) 130. The injection point(s) 130 may allow fluid to be injected or otherwise provided from the fluid passage(s) 120 to the material passage 110. In some examples, the injection point(s) 130 may be a non-return valve, a check valve, a clack valve, a one-way valve, and/or a nozzle that may transfer fluid from the fluid passage(s) 120 into the material passage 110.

In some examples, the injection point(s) 130 may be substantially perpendicular to material passage 110 and the fluid passage(s) 120. The injection point(s) may direct the fluid perpendicular to the flow 150 of material through the material passage 110 or with respect to the length of the material passage 110. In some examples, the injection point(s) may provide the fluid at an angle with respect to the flow 150 of material through the material passage 110, such as thirty degrees, forty-five degrees, sixty degrees, or other angle between zero and ninety degrees to move the material.

In some examples, the elongate apparatus 100 may be operative in a pressure range of between 0 bar and 136 bar. In such examples, the fluid passages 120, the injection points 130, and/or the material passage 110 may be operable in pressure ranges of 0 bar to 136 bar. In some examples, the elongate apparatus 100 may operate in a pressure range between 34 bar and 136 bar. Each component may be tested to withstand interior pressures in these ranges.

In some examples, the elongate apparatus 100 may have structural properties that is sufficient to support the weight of the elongate apparatus 100 itself and the material and fluid contained therein and passing therethrough. For example, the fluid passages 120 may have a compressive strength or tensile strength that is sufficient to support the weight of the fluid passages 120 themselves and the fluid contained therein and passing therethrough. Similarly, the material passages 110 may have structural properties that are sufficient to support the weight of the material passages 110 themselves and the material and fluid contained therein and passing therethrough. The structural properties should be sufficient enough to avoid a failure or rupture of the elongate apparatus 100. The sufficiency of structural properties may vary depending on application, as the parameters of use, materials, and fluids may differ on a per application basis.

In some examples, the fluid may be injected into the material passage 110 in a continuous manner, a selective manner, a periodic manner, and/or a patterned manner. In this manner, any blockage or stoppage due to material in the material passage 110 may be broken up or dislodged due to the fluid injection into material passage 110. The fluid may be injected at varying injection rates. Such injection rate may be controlled manually or automatically using a control system. The injection rate may vary depending on application.

For example, the fluid may be injected into the material passage 110 in a pulsed and/or toggled manner. The fluid may be pulsed, toggled, or switched between a first pressure (e.g., relative high pressure) and a second pressure (e.g., relative low pressure). The high pressure may be active for a period of time and then become inactive. When the high pressure becomes inactive, the low pressure mode become active for a period of time. Such change in pressure may be controlled at and/or by the fluid source. This process may be repeated periodically and/or randomly to create a pulsing effect. In this manner, the fluid being injected into the material passage 110 from the fluid passage(s) 120 may be pulsed to increase fluid flow through the material passage 110 and/or to more effectively break up any blockages in the material passage 110.

The elongate apparatus 100 may have an exterior covering 140 encompassing, surrounding, and/or covering the material hose and/or the material passage 110, the fluid hose and/or the fluid passage(s) 120, and the injection points 130. The exterior covering 140 may extend along the length (or a substantial portion thereof) of the elongate apparatus 100. In this manner, the material passage 110 and the fluid passage(s) 120 may be effectively integrated into a single unit—the elongate apparatus 100. In other words, the fluid passage(s) 120 may be integrated with the material passage 110. Compared to conventional bulk transfer mechanisms, this may allow easier handling and storage (e.g., hose reels) of elongate apparatus 100 because bulky external air hose/line fittings are not necessary. Additionally, elongate apparatus 100 may have integral flotation attributes due to fluid present in the fluid passage(s) 120, other fluid retaining mechanisms, and/or flotation additives (e.g., foam) in or around the elongate apparatus 100. This may be particularly useful in aquatic work environments.

The exterior covering 140 may be flexible, semi-flexible, and/or rigid. In some examples, the exterior covering 140 may be made of plastic, rubber, composites, polymers, and/or metals. For example, the exterior covering 140 may be made synthetic rubber, natural rubber, nylon, polyurethane, polyethylene, poly(vinyl chloride), polytetrafluoroethylene, stainless steel, and/or other known substances. In some examples, the exterior covering 140 may be constructed of the same substance as the material passage 110 and/or the fluid passage(s) 120, while in some examples the exterior covering 140, the fluid passage(s) 120 and the material passage 110 may be constructed of different substances.

Some example elongate apparatuses 100 may be manufactured via a curing process. For example, the fluid hoses and/or the fluid passages 120 may be wrapped together by the exterior covering 140 with the material hose and/or the material passage 110 with injection points 130 therebetween. Together, these components may be cured to become a single or integrated elongate apparatus 100. In another example, the exterior covering 140 may surround the material hose and/or material passage 110, the fluid hose and/or fluid passages 120, and the injection points 130 along the length of the elongate apparatus 100, and then all components may be cured to form an integrated elongate apparatus 100.

Figure 2:
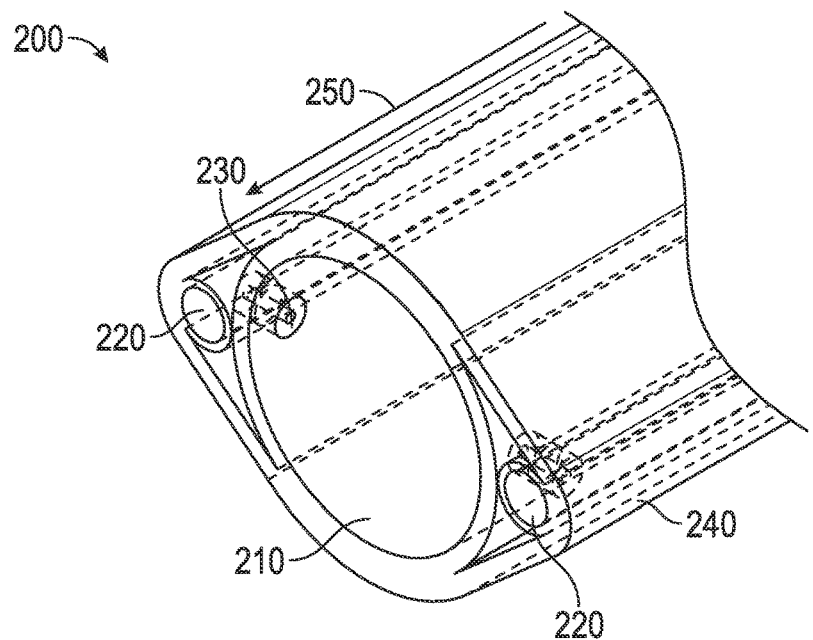
FIG. 2 depicts a close-up perspective view of the example elongate apparatus of FIG. 1.

FIG. 2 is a close-up, transparent perspective view of the example elongate apparatus shown in FIG. 1. The transparent view of FIG. 2 depicts the elongate apparatus 100 of FIG. 1 with greater clarity. Like elements in FIGS. 1 and 2 are represented by like numbers. For example, elongate apparatus 200 corresponds to elongate apparatus 100. Similarly, material passage 210 corresponds to material passage 110, fluid passages 220 corresponds to fluid passages 120, and injection points 230 corresponds to injection points 130. Exterior covering 240 is transparent for clarity, and corresponds to exterior covering 140.

Figure 3:
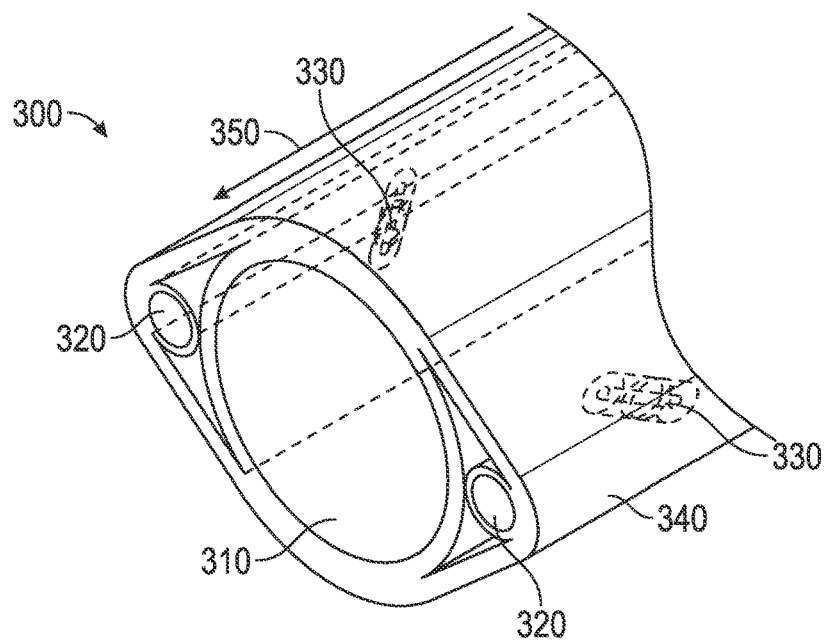
FIG. 3 depicts a close-up perspective view of another example elongate apparatus.

FIG. 3 depicts a close-up transparent perspective view of another example elongate apparatus 300. FIG. 3 depicts a material passage 310 in fluid communication with fluid passages 320 via injection points 330. Exterior covering 340 surrounds these components. The injections points 340 are depicted as being angled toward the material flow direction 350. As described previously, the injection points 340 may be at an angle with respect to the flow 350 of material through the material passage 310. An example angle ranges may be between zero and ninety degrees relative to the material flow direction 350.

While FIGS. 1-3 depict the flow of material in a specific direction 150, 250, 350, elongate apparatus 100, 200, 300, respectively, may allow for bi-directional material flow and/or material flow in a direction different than shown in FIGS. 1-3.

Figure 4:
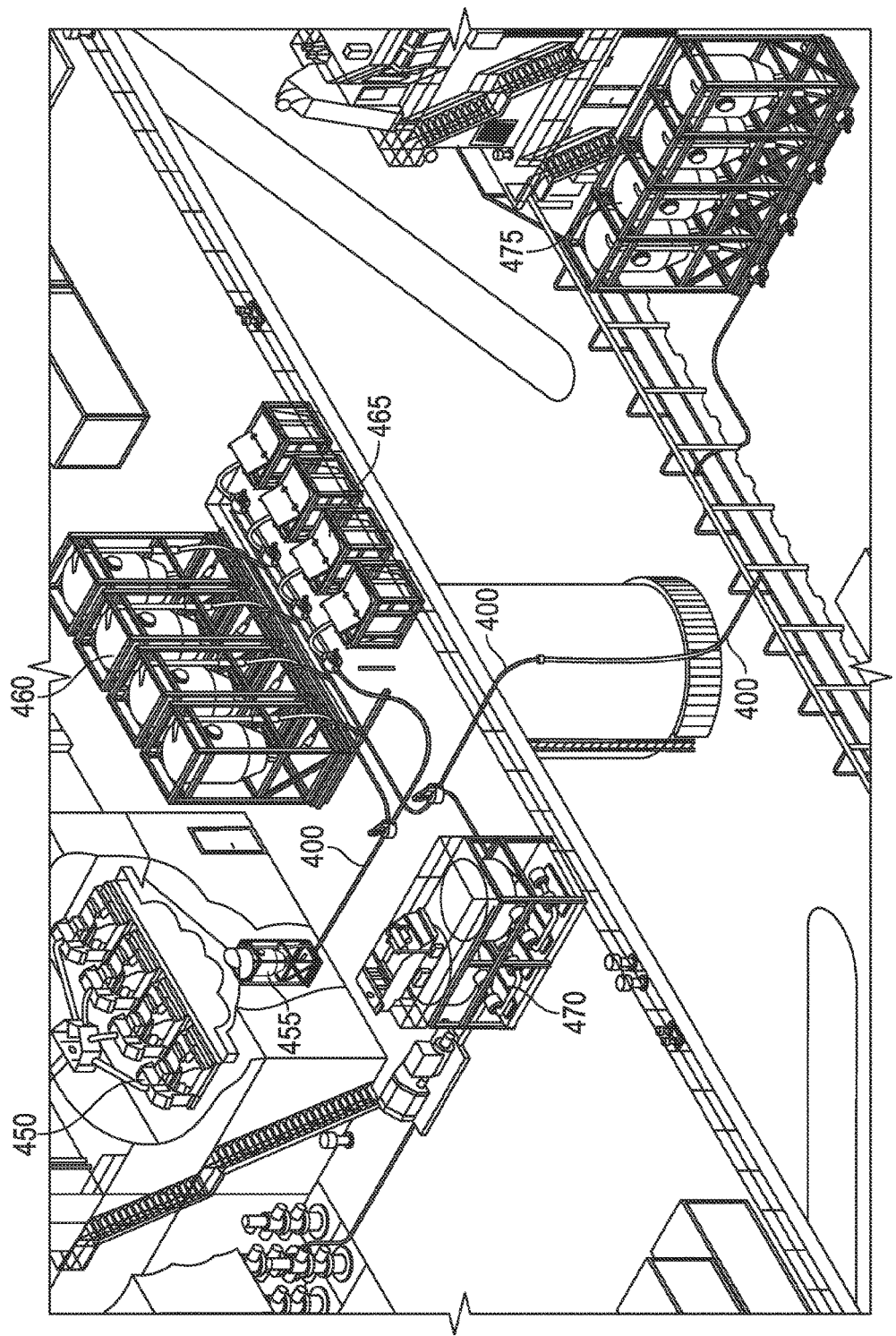
FIG. 4 depicts an example environment utilizing an example elongate apparatus in which all arranged in accordance with at least some of the embodiments disclosed in the present disclosure.

FIG. 4 depicts an example environment utilizing an example transfer hose 400, in accordance with at least one embodiment of the present disclosure. Drilling materials such as drilling fluid and cuttings may be separated at shaker(s) 450. Cuttings discharged from shaker(s) 450 may be transferred to blower 455 to be batch discharged. Blower 455 may batch discharge cuttings, which may be transferred via transfer hose 400 to storage units 460, to loading stations 465, and/or buffer storage 470. Transfer hose 400 may also transfer cuttings among and/or between storage units 460, loading stations 465, and/or buffer storage 470, as conducted by applications. In some examples, transfer hose 400 may transfer cuttings to storage units 475 on a transportation vessel.

In some examples, transfer hose 400 may include multiple hoses coupled together via fittings. For example, FIG. 4 depicts transfer hose 400 having multiple hoses combined together such as between shakers 450 and storage units 460, between shakers 450 and loading stations 465, between storage units 460 and buffer storage 470, between storage units 460 and storage units 475 on the vessel. Unlike conventional large external fittings coupling multiple hoses, transfer hose 400 may have a reduced form factor due, at least in part, to fluid hoses integrated into the transfer hose 400. In this manner, conventional external fittings to inject fluid into the transfer hose 400 are unnecessary. In some examples, fluid may be injected at several points along a transfer hose 400 that includes multiple transfer hoses 400 coupled together via fittings. In such examples, the fluid source may inject fluid into the transfer hose 400 via one or more fittings coupling the multiple transfer hoses 400 together.

In use, one example material that may be conveyed through the transfer hose 400 is drill cuttings. Drill cuttings may be discharged from shaker(s) 450. A drilling operator may desire to remove the drill cuttings from the onsite shaker(s) 450 to an offsite location. In some examples, the drilling operator may wish to transfer the drill cuttings from an offshore oil rig to an onshore processing facility. To do this, a transportation vessel (e.g., a ship) may transport the drill cuttings from the offshore oil rig to an onshore processing facility. To effectuate this transfer, the transfer hose 400 may be used to first transfer drill cuttings from the offshore oil rig to the transportation vessel, which may transport the cuttings to the onshore processing facility.

In some examples, the transfer hose 400 may be coupled to the shaker(s) 450 to receive the drill cuttings from a discharge end of the shaker(s) 450. The inlet end of the transfer hose 400 may be directly or indirectly coupled to the discharge end of the shaker(s) 450 to receive the drill cuttings. The outlet end of the transfer hose 400 may be directly or indirectly coupled to storage unit(s) 460 or storage unit(s) 475 on the vessel. In some examples, the transfer hose 400 may be decoupled from storage units(s), such as when the storage unit(s) are full of drill cuttings. In some examples, the storage unit(s) may be located on the offshore oil rig (e.g., storage unit(s) 460) and then physically moved to a transportation vessel. In some examples, the storage unit(s) may already be located on the transportation vessel (e.g., storage unit(s) 475).

The drill cuttings may move within the transfer hose 400 via gravity and/or assistance from the fluid hose(s) integrated in the transfer hose 400. To encourage movement through the transfer hose 400 from the shaker(s) 450 to a destination (e.g., storage unit(s)), fluid such as air may be injected into the transfer hose 400 from the fluid hose(s) to continue flow of drill cuttings toward the destination. Similarly, to break up blockages of excess drill cuttings in the transfer hose 400, fluid such as air may be injected into transfer hose 400 to break up such blockages. Fluid may be injected into the transfer hose 400 in a continuous manner, a selective manner, a periodic manner, and/or a patterned manner. Fluid injection may be controlled manually by an operator and/or occur automatically via a controller (e.g., computer controlled system).

While various aspects and embodiments have been disclosed herein, other aspects and embodiments will be apparent to those skilled in the art. The various aspects and embodiments disclosed herein are for purposes of illustration and are not intended to be limiting.

We claim:
1. An elongate apparatus comprising:
a material passage to receive material therethrough;
at least two fluid passages in fluid communication with the material passage by a plurality of injection points; and
an exterior covering surrounding the material passage and the at least two fluid passages, wherein
the plurality of injection points are configured to allow a fluid to pass from the at least two fluid passages to the material passage, wherein the plurality of injection points comprises a plurality of valves,
the material passage and the one or more fluid passages extend substantially parallel throughout the apparatus,
each valve of the plurality of valves has a total length defined between a first end and a second end opposite with respect to the first end, and
the total length of each valve is positioned between the material passage and one fluid passage of the at least two fluid passages such that the first end of each valve terminates at the material passage and the second end of each valve terminates at the one fluid passage of the at least two fluid passages.

2. The apparatus of claim 1, wherein fluid is introduced from the at least two fluid passages to the material passage.

3. The apparatus of claim 1, wherein the plurality of valves comprises at least one of a non-return valve, a check valve, a clack valve, a one-way valve, and/or a nozzle.

4. The apparatus of claim 1, wherein the plurality of injection points are perpendicular to the material passage such that the fluid may enter the material passage at about a 90 degree angle relative to a flow of the material in the material passage.

5. The apparatus of claim 1, wherein the plurality of injection points are positioned such that the fluid may enter the material passage in a range of about a 30-degree angle to about a 60-degree angle relative to a flow of the material in the material passage.

6. The apparatus of claim 1, wherein the exterior covering, surrounding the material passage and the at least two fluid passages, extends along a length of the apparatus.

7. The apparatus of claim 1, further comprising:
a fluid source in fluid communication with at least one of the at least two fluid passages, the fluid source supplying the fluid through the at least two fluid passages and into the material passage.

8. An elongate apparatus comprising:
a material passage to receive material therethrough;
at least two fluid passages in fluid communication with the material passage via a plurality of injection points;
the plurality of injection points configured to allow a fluid to pass from the at least two fluid passages to the material passage, wherein the plurality of injection points comprises a plurality of valves; and
an exterior covering surrounds the material passage and the at least two fluid passages,
wherein the material passage and the at least two fluid passages extend substantially parallel throughout the apparatus, each valve of the plurality of valves has a total length defined between a first end and a second end opposite with respect to the first end and the total length of each valve is positioned inside the exterior covering surrounding the material passage and the at least two fluid passages.

\* \* \* \* \*